United States Patent Office 3,196,666
Patented July 27, 1965

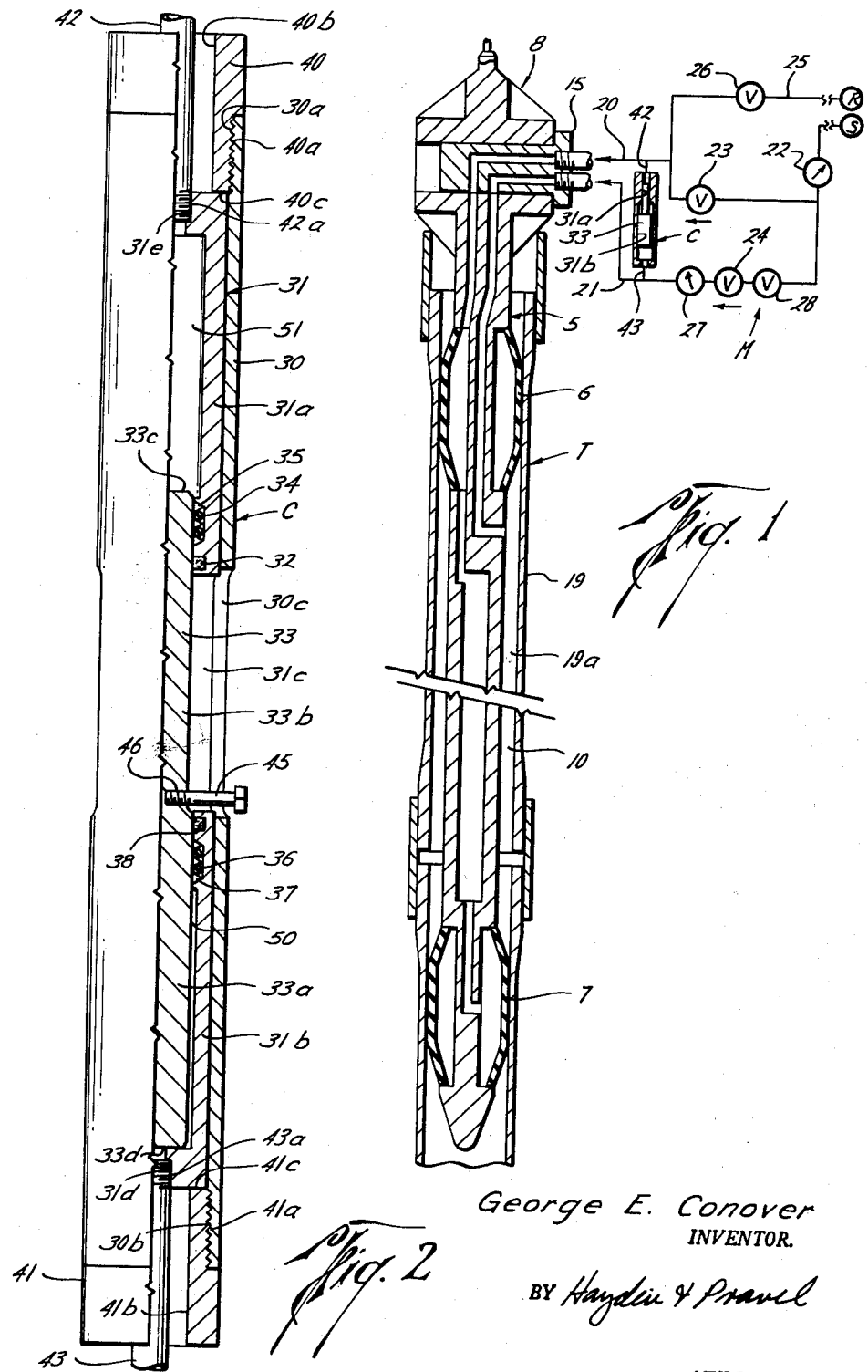

3,196,666
COMPENSATOR
George E. Conover, Houston, Tex., assignor to
Lynes, Inc., a corporation of Texas
Filed May 18, 1962, Ser. No. 195,724
5 Claims. (Cl. 73—40.5)

The present invention relates to a new and improved device and method for maintaining predetermined pressure differentials and more particularly to a new and improved compensator for a hydraulic system used with a hydrostatic testing tool for tubular members.

In hydrostatically testing tubular members for leaks, it is customary to seal off a section of the tubular member by means of hydrostatic pressure upon closure elements positioned on each side of the section to be tested. Once such closure elements are closed, fluid is injected into the test annulus up to a predetermined test pressure. The most effective closure elements are of the inflatable packer type which are normally made of rubber or other similar resilient material and which are incorporated in a hydrostatic testing tool. The test pressure must be less than the inflation pressure for the closure elements in order to seal the closure elements in most testing tools of this type.

When employing pressure actuated closure or sealing elements such as inflatable packers at relatively high pressures, for example, pressures of about 5,000 pounds per square inch or greater, it becomes a delicate matter to build up the necessary pressure in the packers without exceeding such amount. For example, assuming that 7,000 pounds per square inch is the desired pressure to seal the packers or closure elements, careful and close control of the pressure being applied to such packers or closure elements is required in order to get the pressure up to about 7,000 pounds per square inch without allowing the pressure to continue to raise up to 7,500 or even 8,000 pounds per square inch. Pressures applied to the packers above and beyond the actual amount required for the job are very undesirable since excessive fluid pressures tend to shorten the life of inflatable elements of the packers, as well as the hoses and other auxiliary parts subjected to such fluid pressures. Also, since the rubber or similar resilient materials used for the packer elements tend to cold-flow or exhibit hysteresis characteristics when subjected to sustained pressure, such rubber or similar material moves just so far when first placed under a predetermined pressure, but, thereafter, without the application of any additional pressure, the rubber or similar material continues to move, gradually slows down in its expansion or movement, and then stops at its final elongation or maximum movement. Such cold-flowing or hysteresis results in a drop in the pressure in the packers so that additional pressure must then be applied in an attempt to bring the final pressure up to the desired amount without substantially exceeding it. Such procedure is therefore not only a delicate operation, but it is also very time consuming if done properly.

It is therefore an object of this invention to provide a novel means for obtaining and maintaining predetermined pressures in pressure actuated sealing or closure elements such as inflatable packers which overcomes the aforesaid problems of time delay and excessive pressures.

It is a principal object of the present invention to provide a new and improved means for automatically maintaining predetermined pressure differentials.

Another important object of the present invention is to provide a new and improved compensating device which automatically compensates for hysteresis characteristics in inflatable elements.

Still another object of the present invention is to provide a new and improved device which automatically maintains pressure differentials at predetermined amounts.

A further object of the present invention is to provide a new and improved device for compensating for changes in predetermined pressure differentials to thereby maintain any predetermined pressure, and wherein such device has means therewith for quickly and easily adjusting the setting of the predetermined pressure differential to be maintained.

Yet a further object of the present invention is to provide a new and improved compensating device for maintaining selected pressure differentials between the interior and the exterior of inflatable closure elements used in testing pipes for leaks, whereby the desired amount of inflation of the closure elements is maintained during the tests.

Yet a further object of the present invention is to provide a new and improved method for hydrostatically testing tubular members with spaced inflatable sealing elements, wherein a compensating device is employed in the pressure lines or hoses to automatically adjust or compensate for lags or drops in pressure interiorly of the inflatable sealing elements because of the cold-flowing or hysteresis of such elements.

Still a further object of the present invention is to provide a new and improved pressure differential compensating device which particularly facilitates the testing of pipes or tubular members at relatively large hydrostatic pressures, for example, about 5,000 pounds per square inch or greater.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

FIG. 1 is a view of the present invention, partly in section and partly schematic, which illustrates the complete hydrostatic testing apparatus for well pipes and the like; and FIG. 2 is a quarter sectional detailed view of the compensator device shown schematically in FIG. 1.

Referring to the drawings, the preferred form of the compensator device of the present invention is indicated generally at C in FIG. 2. In FIG. 1, the arrangement for conducting inflating fluid to the well tool T is represented at M, and the device C is shown in the conduit means M for operation with the well tool T.

The hydrostatic testing tool T illustrated in FIG. 1 of the drawings is shown in more detail in my application entitled "Well Tool" filed in the U.S. Patent Office on June 2, 1960, and bearing Serial No. 33,555, now United States Patent No. 3,173,290.

With the exception of the compensator device C, the conduit means M illustrated in FIG. 1 of the drawings is shown in my application entitled "Method and Apparatus of Hydrostatic Testing of Tubular Members" filed in the U.S. Patent Office on September 19, 1960, and bearing Serial No. 56,749, now abandoned.

The testing tool T includes the body 5 which has thereon the spaced inflatable elements 6 and 7 of known construction. The upper end of the body 5 is provided with a manifold arrangement or control head referred to generally by the numeral 8 which functions to enable the spaced elements 6 and 7 to be inflated and which also separately communicates the test fluid through the body 5 and into the portion 19a of the pipe or tubular member 19 extending between the closure or seal elements 6 and 7 for testing thereof, as will be described more in detail hereinafter. An annulus or annular area 10 is formed between the tubular portion 19a and the outside of the body 5 for receiving the test fluid so that if a leak is present in the portion 19a under test, the test fluid will flow through the leak. Also, the test fluid in the annulus 10 will have a sufficiently high pressure to also test the portion 19a for weak spots or portions therein, as is well known.

The conduit means M connecting with the tool T includes a line or hose 20 which communicates through the fitting 15 and manifold assembly 8 with each of the inflatable spaced elements 6 and 7, and also includes the conduit or line 21 which is separate from the conduit 20 and communicates through the fitting 15, manifold 8 and through the tool body 5 directly into the annulus 10. A pressure gauge 22 is provided in the conduit means M for indicating the pressure of the fluid supplied thereto from an outside pump source S to the tool T. Additionally, a one-way acting check valve 23 is provided in the line 20, and a one-way check valve 24 is provided in the line 21. Each of the check valve means 23 and 24 prevents the reverse flow of liquid from the elements 6 and 7 and from the annulus 10 so as to insure proper operation and functioning of the hydraulic system and test tool.

In order to discharge the liquid from the spaced elements 6 and 7 after the test has been completed, a conduit 25 is provided which communicates the conduit 20 with a water or liquid reservoir R of any suitable type. A valve 26 is provided in the line 25 which is normally closed as the elements 6 and 7 are inflated and while the testing operations are being carried out; however the valve 26 will be opened when it is desired to deflate the elements 6 and 7 so that the fluid from such elements will flow through the line 25 and back to the water or testing fluid tank for subsequent reuse. When the elements 6 and 7 have been deflated after a test, the liquid in the annulus 10 will drop through the tubular member 19 in the well bore.

As a practical matter, the tool T of the present invention is constructed and arranged so that it occupies a substantial part of the volume of the bore of member 19, and when it is positioned in the tubular member 19, the annulus 10 between the tool and member 19 will be of a relatively small volume. Also, an instrument means as indicated at 27 is connected in the line 21 and communicates by means of such line and the tool body 5 directly with the annulus 10 between elements 6 and 7. In testing, this arrangement enables the initial pressure of the liquid within the annulus 10 to be instrumentally noted, and any variations or pressure drops in the pressure as indicated by the instrument means 27 will indicate that fluid or liquid has been lost from the annulus 10, which in turn indicates a leak or rupture in the tubular member under test.

It has also been determined that in some situations the leaks in the tubular members being tested are so minute that only relatively small leakage occurs from the annulus 10, such leakage being in the magnitude of only a drop or two of liquid in a given unit of time. By connecting the pressure gauge directly with the annulus 10 through the conduit 21 and by retaining the annulus 10 at a relatively small volume, it can be appreciated that even a loss of one drop of water from the annulus will be a substantial volume loss in relation to the total volume of the annulus. Thus, the instrument means 27 functions as a sensitive means for determining even minute losses of hydraulic pressure from the portion of the tubular member under test.

The line 21 of the conduit means M also includes a valve 28 for communicating the line 21 with the fluid source S.

As a practical matter, the tool T of the present invention is constructed and arranged so that it occupies a substantial part of the volume of the bore of member 19, and when it is positioned in the tubular member 19, the annulus 10 between the tool and member 19 will be of a relatively small volume. Also, an instrument means as indicated at 27 is connected in the line 21 and communicates by means of such line and tool body 5 directly with the annulus 10 between elements 6 and 7. In testing, this arrangement enables the initial pressure of the liquid within the annulus 10 to be instrumentally noted, and any variations or pressure drops in the pressure as indicated by the instrument means 27 will indicate that fluid or liquid has been lost from the annulus 10, which in turn indicates a leak or rupture in the tubular member under test.

It has also been determined that in some situations the leaks in the tubular members being tested are so minute that only relatively small leakage occurs from the annulus 10, such leakage being in the magnitude of only a drop or two of liquid in a given unit of time, such as, one-half minute. By connecting the pressure gauge directly with the annulus 10 through the conduit 21 and by retaining the annulus 10 at a relatively small volume, it can be appreciated that even a loss of one drop of water from the annulus will be a substantial volume loss in relation to the total volume of the annulus. Thus, the instrument means 27 functions as a sensitive means for determining even minute losses of hydraulic pressure from the portion of the tubular member under test.

The line 21 of the conduit means M also includes a valve 28 for communicating the line 21 with the fluid source S.

It should be understood that although the compensator C of the present invention has been shown with the particular well tool T and the particular conduit means or valve arrangement M such is for purposes of illustration only, and the compensator C may be used with any other suitable testing tool and/or conduit means without departing from the scope of the invention.

The compensator C of the present invention is illustrated in detail in FIG. 2. In the preferred form of the invention, the compensator C includes the body or housing 30 in which is positioned a cylinder 31 having an upper section 31a and a lower section 31b and with a slot 31c therebetween. The internal diameter of the cylinder section 31b is larger than the internal diameter of the cylinder section 31a. The size or the diameter of the cylinder sections 31a and 31b is determined primarily on the basis of the pressures used in testing for leaks and the pressure used to properly inflate the elements 6 and 7. For example, in utilizing a test pressure of about 5,000 pounds per square inch, it has been found that the inflating pressure for the packer elements 6 and 7 should be about 6,500 to 7,000 pounds per square inch. On such basis, the cross-sectional area of the larger cylinder section 31b is approximately 1.3 to 1.4 times as great as the cross-sectional area of the smaller cylinder section 31a.

A piston or plunger 33 having an enlarged portion 33a and a smaller portion 33b is positioned longitudinally in the cylinders so as to move slidably therein. The enlarged end 33a of the piston 33 is adapted to move in the cylinder section 31b, and the smaller portion 33b of the cylinder 33 is adapted to move in the cylinder section 31a. A seal means such as O-rings 34, back-up rings 35 and packing 32 are mounted in the bore of the lower end of the cylinder section 31a for forming a fluid seal between the cylinder section 31a and the smaller portion 33b of the piston 33.

Suitable seal means such as O-rings 36, back-up rings 37, and packing 38 are provided at the upper end of the cylinder section 31b for forming a fluid seal between the cylinder section 31b and the piston portion 33a.

The housing 30 has upper and lower threaded end portions 30a and 30b, respectively, for receiving the threaded ends 40a of the end cap 40, and 41a of the end cap 41, respectively.

Each of the end caps 40 and 41 has a suitable opening 40b and 41b, respectively, for receiving the conduits or lines 42 and 43, respectively. The end caps or coverings 40 and 41 serve primarily to retain the cylinder 31 in the housing 30.

The cylinder 31 has a threaded opening 31e for sealably receiving the threaded end 42a of the conduit 42. As can be seen in FIG. 2, fluid introduced through the line 42 into the housing 30 will enter the chamber 51 and act on the upper end 33c of the piston 33.

The cylinder 31 has a second threaded opening 31d for sealably receiving the threaded end 43a of the line 43. Any fluid introduced through the line 43 into the housing 30 will enter the chamber 50 and act on the lower end 33d of the piston 33.

In order to visually determine the position of the piston 33 in the cylinder 31, an indicating pin or bolt 45 is threadedly secured to the piston 33 at 46 so as to move with such piston 33. The housing 30 has a longitudinal slot or opening 30c therein in alignment with the slot 31c in the cylinder 31 for enabling the bolt 45 to move with the piston 33. It can easily be seen that the position or location of the bolt 45 in the slot 30c will readily indicate the position of the piston 33 in the cylinder 31.

Referring again to FIG. 2, the compensating device C is connected in the conduit means M with the line 42 being connected to the line 20 and with the line 43 being connected to the line 21. As the line 21 used with the tool T has a lesser pressure therein than the inflating or sealing pressure in the line 20, the line 21 is connected to the cylinder section 31b which has the larger internal diameter as compared to the cylinder section 31a.

By reason of the difference in the diameters of the portions 33a and 33b on plunger 33 when a fluid under pressure is introduced into chambers 50 and 51 from the source S through the valves 23 and 24 at a predetermined pressure, the compensating device C maintains a predetermined differential between the pressure in the testing line 21 and the sealing line 20. The pressure differential between the pressure in the line 20 and the pressure in the line 21 is determined by the difference in the cross-sectional areas of the plunger portions 33a and 33b as noted above. The particular pressure utilized in any test from the source S will be the pressure in the line 21, but the pressure in the line 20 will be greater by the amount of difference between the areas of the plunger portions 33a and 33b.

The compensator C thus automatically adjusts so that in testing it automatically builds up a greater pressure inside the inflatable elements 6 and 7 than the test pressure being utilized. For test pressures around 5,000 pounds per square inch and with the compensator C built with an area ratio of about 1.3, the pressure in the line 21 will be at 5,000 pounds per square inch and the pressure in the line 20 will be about 6,500 pounds per square inch. The compensator C also prevents the pressure from being built up in the line 20 to a higher amount than desired.

The cold-flow or hysteresis of the rubber or other material of the packer elements 6 and 7 is compensated for by the compensator C since an expansion of the elements 6 and 7 due to such cold-flow will increase the pressure in the annulus 10 and in line 21 to cause the piston 33 to move in the cylinder 31. Such movement of the piston 33 continues until the pressures in lines 20 and 21 are in the differential according to the ratio of the areas of the cylinder sections 31a and 31b. Thus, with the original pressures at 5,000 and 6,500 pounds per square inch, as the hysteresis takes place the test pressure of 5,000 pounds will tend to increase to 6,000 pounds as the packing elements 6 and 7 cold-flow, but the test pressure will drop back to 5,000 pounds and return the pressure in packers 6 and 7 to 6,500 pounds by the aforesaid action of the compensator C. Thus, there is an automatic compensation for the cold-flow or hysteresis of the packers 6 and 7 so as to maintain the pressure differential interiorly and exteriorly of the packers 6 and 7 at predetermined value as controlled by the differential areas of the plunger portions 33a and 33b of the compensator C. In some situations, it may be desirable to use a spring in the compensator to initially position the plunger 33 at one end of the compensator. It will be understood that the compensator C may be made for any predetermined pressure differential setting, and several of such compensators may be alternately used to quickly and easily adjust the pressure differential in the apparatus T. Also, the compensator may be formed as part of the tool T.

The foregoing disclosure and description of the invention is illustrative and explanatory thereof and various changes in the size, shape, and materials as well as in the details of the illustrated construction may be made within the scope of the appended claims without departing from the spirit of the invention.

What is claimed is:

1. An apparatus for testing tubular members for leaks, comprising, a tool, said tool including a body adapted to be inserted in the tubular member to be tested, spaced closure elements on said body for sealing off a portion of the tubular member between said elements, a control head on said body having passage means therein, said body having passage means for flowing fluids from the control head to activate said closure elements to a sealed off position, passage means in said body for communicating with the tubular member portion between said elements in the tubular member, additional passage means in said control head communicating with said last named passage means in said body for flowing fluids to the sealed off portion between said elements after said elements are in sealed off position, a pair of conduit means for conducting fluid to said control head, one of said conduits connected to said control head passage means that communicates with said elements and the other of said pair of conduits connected with said control head passage means that communicates with said sealed off portion of the tubular member, and compensating means connected between said pair of conduit means, said compensating means including a pair of pistons and cylinders for transferring a greater pressure to said conduit that communicates with said elements than exists in said conduit that communicates with said sealed off portion of the tubular member.

2. A method of testing tubular members for leaks with fluid pressure, comprising the steps of positioning spaced inflatable elements in the tubular member to be tested, conducting fluid under pressure through a line to inflate them and seal off an annular area in the tubular member, conducting liquid through another line to the annular area between the inflated elements to test it for leaks, instrumentally determining any pressure drop in the line conducting liquid to the member as an indication of leaks in the member, and automatically maintaining a predetermined pressure differential between the fluid in said lines whereby the fluid pressure in the conduit connected with the elements always exceeds the pressure in the conduit to the sealed off annular area during the test.

3. A method of hydrostatically testing tubular members for leaks, comprising the steps of, positioning spaced closure elements in the tubular member to be tested for sealing off a zone in the tubular member between the spaced closure elements, conducting liquid through a line to move the spaced closure elements to sealing position in the tubular member, conducting liquid through another line to the tubular member between the spaced closure elements to test it for leaks, instrumentally determining any pressure drop in the line conducting liquid to the tubular member as an indication of leaks in the member, and automatically regulating pressure differentials between each of said lines for maintaining predetermined pressures in each of said lines whereby the fluild pressure in the conduit connected with the elements always exceeds the pressure in the conduit to the sealed off angular area during the test.

4. A compensating device adapted to be connected between the test line and sealing line of an apparatus for testing tubular members with fluid pressure to maintain a greater pressure in the sealing line than exists in the test line, comprising a housing, a cylinder in said housing, said cylinder having a first cylinder section with a greater internal diameter than a second cylinder section of said cylinder, a piston having an enlarged portion thereon for longitudinal movement in said larger cylinder section and a smaller portion thereon for longitudinal movement in the smaller cylinder section, conduit means for introducing fluid into each of said cylinder sections for moving said pistons, means for communicating fluid from the test line with said first cylinder section having the larger internal diameter and means for communicating fluid from the seal line with said second cylinder section having the smaller internal diameter.

5. An apparatus for testing tubular members for leaks, comprising, a tool, said tool including a body adapted to be inserted in the tubular member to be tested, spaced closure elements on said body for sealing off an annular area in the tubular member, a control head on said body for flowing fluids to activate said closure elements to a sealed off position, passage means in said body for communicating with the sealed off annular area between said elements in the tubular member, additional passage means in said control head for communicating with said passage means and exteriorly of said tool for flowing fluids to sealed off annular area after said elements are in sealed off position, conduit means for regulating the flow of fluid to said control head, one of said conduits connected to said control head passage means that communicates with said elements, and the other of said pair of conduits connected with said control head passage means that communicates with sealed off portion of the tubular member, and compensating means connected between said pair of conduit means for automatically maintaining a greater pressure in said elements than exists in the sealed off annular area.

References Cited by the Examiner
UNITED STATES PATENTS

| | | | |
|---|---|---|---|
| 1,368,147 | 2/21 | Hennebohle | 73—49.4 |
| 2,218,155 | 10/40 | Rusler et al. | 166—106 |
| 2,707,388 | 5/55 | Kent | 73—49.6 |
| 2,895,328 | 7/59 | Payne et al. | 73—49.4 X |
| 2,953,919 | 9/60 | Potts | 73—40.5 X |
| 3,035,440 | 5/62 | Reed | 73—40.5 |

ISAAC LISANN, *Primary Examiner.*